United States Patent
Inoue et al.

(10) Patent No.: US 10,994,686 B2
(45) Date of Patent: May 4, 2021

(54) VEHICLE SEAT

(71) Applicant: TACHI-S CO., LTD., Tokyo (JP)

(72) Inventors: Takashi Inoue, Tokyo (JP); Akinori Taniguchi, Tokyo (JP); Takayuki Ohmori, Tokyo (JP); Keita Myochin, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 119 days.

(21) Appl. No.: 16/216,198

(22) Filed: Dec. 11, 2018

(65) Prior Publication Data
US 2019/0176741 A1 Jun. 13, 2019

(30) Foreign Application Priority Data
Dec. 13, 2017 (JP) ............................. JP2017-238785

(51) Int. Cl.
| | | |
|---|---|---|
| *B60R 21/207* | (2006.01) | |
| *B60R 21/215* | (2011.01) | |
| *B60R 21/231* | (2011.01) | |
| *B60R 21/217* | (2011.01) | |
| *B60R 21/16* | (2006.01) | |
| *B60N 2/58* | (2006.01) | |

(52) U.S. Cl.
CPC .......... *B60R 21/207* (2013.01); *B60R 21/215* (2013.01); *B60R 21/2176* (2013.01); *B60R 21/23138* (2013.01); *B60N 2002/5808* (2013.01); *B60R 2021/161* (2013.01); *B60R 2021/23146* (2013.01)

(58) Field of Classification Search
CPC ..................................................... B60R 21/207
See application file for complete search history.

(56) References Cited

U.S. PATENT DOCUMENTS

| | | | |
|---|---|---|---|
| 6,439,597 B1 | 8/2002 | Harada et al. | |
| 6,578,911 B2 * | 6/2003 | Harada ................ | B60N 2/5825 |
| | | | 280/730.2 |
| 7,216,934 B1 | 5/2007 | Kobari | |
| (Continued) | | | |

FOREIGN PATENT DOCUMENTS

| | | |
|---|---|---|
| JP | 2002-120686 A | 4/2002 |
| JP | 4452860 B2 | 4/2010 |
| (Continued) | | |

OTHER PUBLICATIONS

Nov. 27, 2020, Chinese Office Action issued for related CN application No. 201811524848.9.

*Primary Examiner* — Nicole T Verley
(74) *Attorney, Agent, or Firm* — Paratas Law Group, PLLC

(57) ABSTRACT

A seat includes an airbag module fixed to a seat frame, a trim cover including a breaking part which breaks according to an inflation and a deployment of an airbag of the airbag module, a first stay cloth and a second stay cloth which guide the inflating and deploying airbag to the breaking part, a first fixing member which is attached to the backside frame and stretches and supports the first stay cloth, and a second fixing member which stretches and supports the second stay cloth, in which the backside frame is provided with a pair of first attachment holes into which both end portions of the first fixing member are inserted and a pair of second attachment holes into which both end portions of the second fixing member are inserted.

4 Claims, 9 Drawing Sheets

(56) References Cited

U.S. PATENT DOCUMENTS

| | | | |
|---|---|---|---|
| 7,971,900 B2* | 7/2011 | Lim | B60R 21/207 |
| | | | 280/730.2 |
| 9,539,975 B2* | 1/2017 | Tanabe | B60R 21/207 |
| 9,738,197 B2* | 8/2017 | Tanabe | B60N 2/66 |
| 10,029,589 B2* | 7/2018 | Tanabe | B60R 21/207 |
| 2002/0063452 A1 | 5/2002 | Harada et al. | |
| 2011/0025034 A1* | 2/2011 | Lim | B60R 21/207 |
| | | | 280/743.2 |
| 2015/0054261 A1* | 2/2015 | Tanabe | B60R 21/26 |
| | | | 280/728.2 |
| 2015/0076802 A1* | 3/2015 | Tanabe | B60R 21/207 |
| | | | 280/730.2 |

FOREIGN PATENT DOCUMENTS

| | | | | |
|---|---|---|---|---|
| JP | 4517214 B2 | 8/2010 | | |
| JP | 4524768 B2 | 8/2010 | | |
| JP | 4543269 B2 | 9/2010 | | |
| JP | 4543270 B2 | 9/2010 | | |
| JP | 2015051700 A * | 3/2015 | | |
| WO | WO-2013094600 A1 * | 6/2013 | | B60R 21/201 |
| WO | WO-2019194197 A1 * | 10/2019 | | B60N 2/68 |

\* cited by examiner

VEHICLE SEAT

CROSS-REFERENCE TO RELATED APPLICATION(S)

This application is based upon and claims the benefit of priority from Japanese Patent Application No. 2017-238785, filed on Dec. 13, 2017, the entire contents of which are incorporated herein by reference.

BACKGROUND

1. Field of the Invention

The present invention relates to a vehicle seat including an airbag module.

2. Description of the Related Art

A vehicle seat including an airbag module is known as a vehicle seat mounted in a vehicle such as an automobile (for example, Japanese Patent No. 4452860, Japanese Patent No. 4517214, Japanese Patent No. 4543269, and Japanese Patent No. 4543270).

In a seat equipped with an airbag module described in Japanese Patent No. 4452860, Japanese Patent No. 4517214, Japanese Patent No. 4543269, and Japanese Patent No. 4543270, the airbag module is attached to a side plate of a seat back frame and is wrapped with two sheets of stay clothes sewn together with a trim cover at a seam serving as a breaking part of the trim cover.

Each of the stay clothes is stretched and supported by a listing wire made of a steel wire, and the listing wire is wound to a rear side of the side plate. A retaining member made of a metal bar or the like is provided on the rear side of the side plate, and an end portion of the listing wires wound to the rear side of the side plate is caught by the retaining member.

An inflating and deploying airbag is guided to the breaking part of the trim cover by the two sheets of stay clothes stretched and supported.

Accordingly, an inflation pressure of the airbag is condensed efficiently to the breaking part to break the breaking part, and the airbag is quickly inflated and deployed through the breaking part.

When a positional relation between two sheets of stay clothes wrapping an airbag module and a positional relation of the two sheets of stay clothes regarding the airbag module are deviated from expected positional relations, an inflation pressure of the airbag may be deviated from a breaking part of a trim cover to obstruct an inflation and a deployment of the airbag.

In a seat equipped with an airbag module described in Japanese Patent No. 4452860, Japanese Patent No. 4517214, Japanese Patent No. 4543269, and Japanese Patent No. 4543270, end portions of two listing wires are tangled and fixed to each other to prevent the deviation in the positional relation between the two sheets of stay clothes. In the seat equipped with an airbag module described in Japanese Patent No. 4452860, Japanese Patent No. 4517214, Japanese Patent No. 4543269, and Japanese Patent No. 4543270, a valley bent part is provided in a retaining member, and the end portions of the two listing wires tangled and fixed to each other are caught by the valley bent part to prevent the deviation in the positional relation of the two sheets of stay clothes regarding the airbag module.

However, an operation of tangling and fixing the end portions of the two listing wires made of a steel wire is a burden to an assembly operation. It relatively requires more effort to perform bending for providing the valley bent part in the retaining member.

SUMMARY

The invention has been made in consideration of the above situation, and an object thereof is to improve a reliability of inflation and deployment of an airbag and to reduce a burden of an assembly operation with a simple configuration in a vehicle seat including an airbag module.

According to an aspect of the invention, there is provided a vehicle seat including: a seat frame; an airbag module fixed to the seat frame; a trim cover including a breaking part in which skin materials are sewn together and which serves as a swelling port of an airbag by being broken according to an inflation and a deployment of the airbag of the airbag module; a first stay cloth and a second stay cloth sewn together at the breaking part with the trim cover and which guide the inflating and deploying airbag to the breaking part; a first fixing member attached to an attachment member which is any of the seat frame and a bracket fixed to the seat frame and stretches and supports the first stay cloth; and a second fixing member attached to the attachment member and stretches and supports the second stay cloth, wherein the attachment member is provided with a pair of first attachment holes into which both end portions of the first fixing member are inserted and a pair of second attachment holes into which both end portions of the second fixing member are inserted.

According to the aspect of the invention, in the vehicle seat including the airbag module, it is possible to improve the reliability of the inflation and the deployment of the airbag and to reduce the burden of the assembly operation with the simple configuration.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
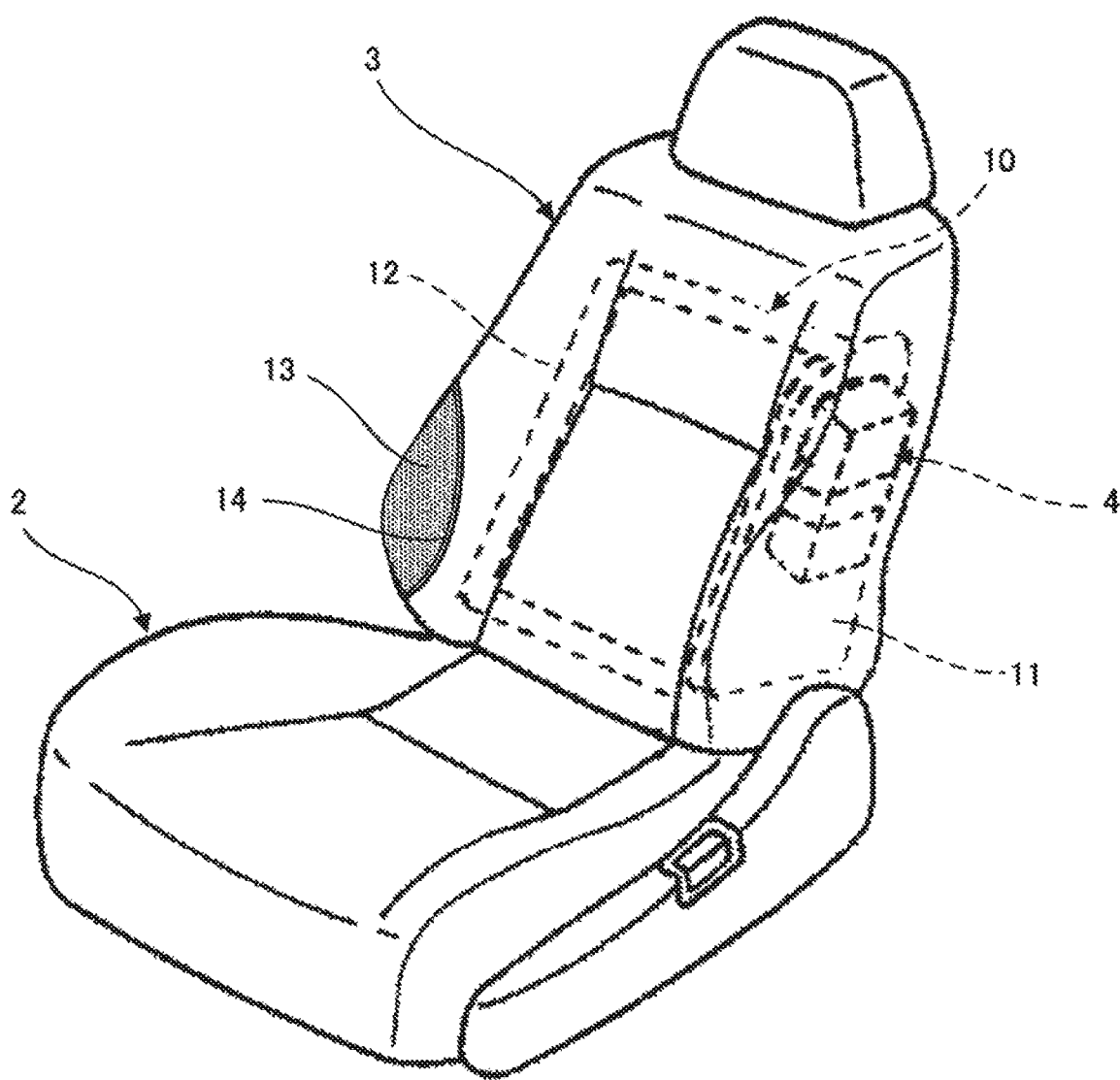
FIG. 1 is a perspective view of one example of a vehicle seat for explaining an embodiment of the invention.

FIG. 1 is a perspective view of one example of a vehicle seat for explaining an embodiment of the invention.

For example, a vehicle seat 1 illustrated in FIG. 1 is a seat provided in a vehicle such as an automobile, and includes a seat cushion 2 which supports a hip and a thigh of an occupant (hereinafter, referred to as a sitting person) sitting on the seat 1, a seat back 3 which supports a waist and a back of the sitting person, and an airbag module 4. In this example, the airbag module 4 is provided in one side portion of the seat back 3 in a seat width direction.

The seat back 3 includes a seat frame 10 which forms the frame of the seat back 3. The seat frame 10 includes a pair of backside frames 11 and 12 provided with a gap in the seat width direction and extend in a seat vertical direction. The seat frame 10 is covered with a cushion pad 13 made of a relatively soft foamed resin material such as urethane foam, and is covered further with a trim cover 14 made of a skin material such as leather, woven cloth, and non-woven cloth.

The airbag module 4 is fixed to the backside frame 11 of one side, is covered with the cushion pad 13 and the trim cover 14, and is incorporated in the seat back 3.

The airbag module 4 includes an airbag and an inflator which inflates and deploys the airbag. An acceleration sensor which detects a collision of the vehicle and an electronic control unit (ECU) which determines whether to require the deployment of the airbag based on a signal output from the acceleration sensor are mounted in the vehicle. The inflator is operated by the ECU, and the airbag is inflated and deployed by the gas generated by the operated inflator. The inflating and deploying airbag breaks the trim cover 14 and swells to outside the seat back 3.

Figure 2:
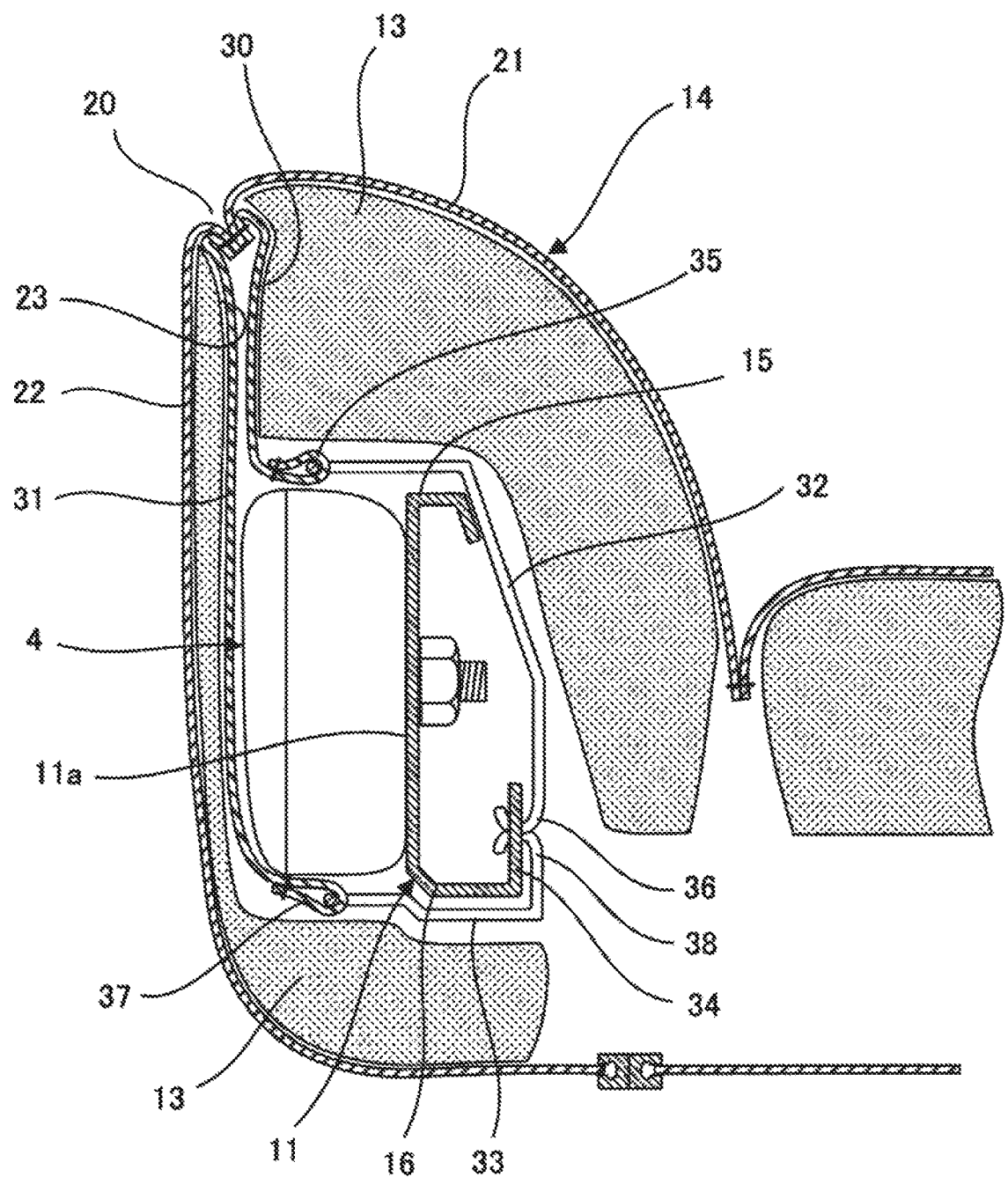
FIG. 2 is a sectional view of an airbag module installation place of the vehicle seat of FIG. 1.
Figure 3:
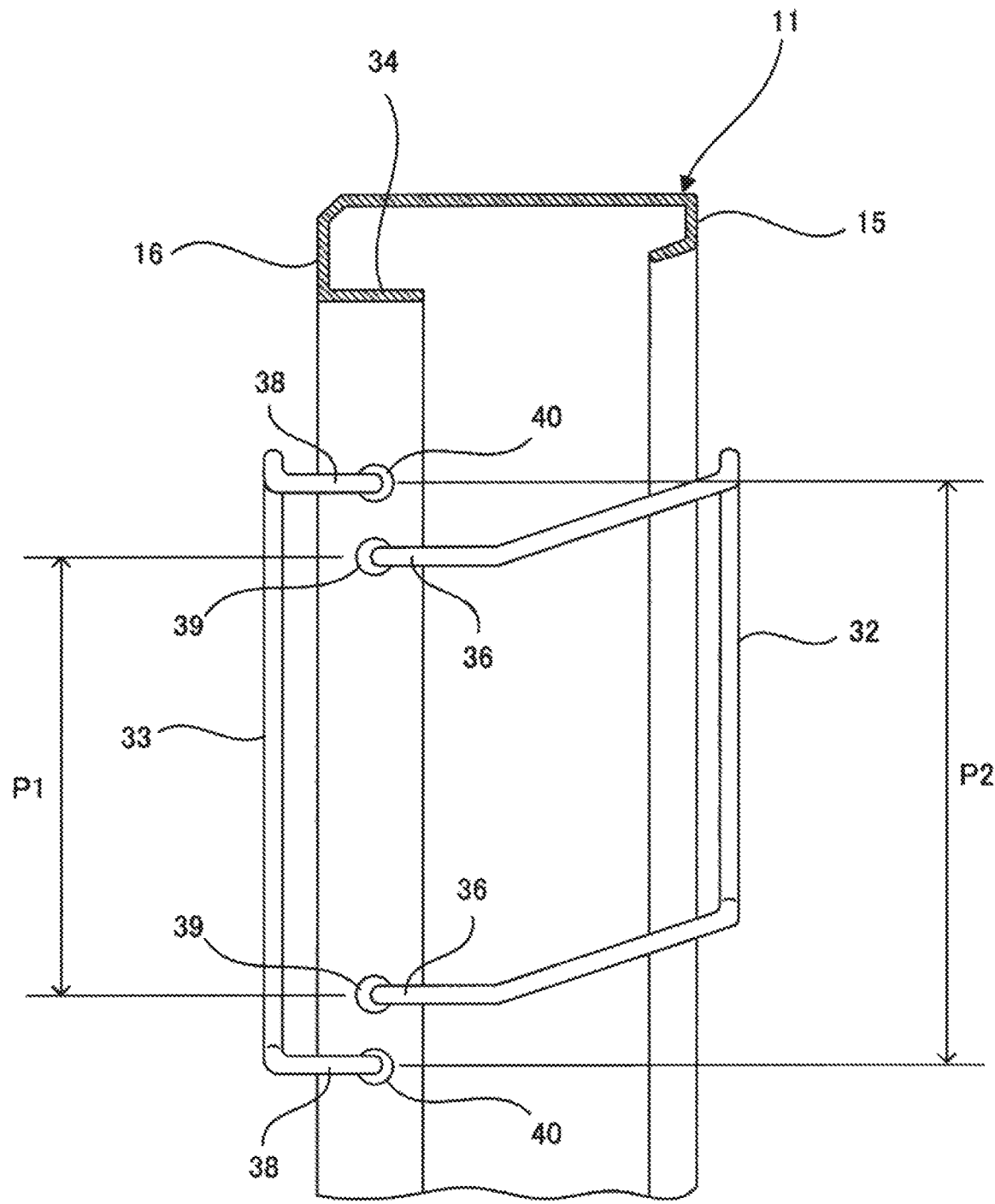
FIG. 3 is a schematic view of the airbag module installation place of FIG. 2.

FIGS. 2 and 3 illustrate a configuration of an installation place of the airbag module 4.

The airbag module 4 is arranged on a surface 11a of the backside frame 11 directed to the outside in the seat width direction and is fixed to the backside frame 11 by a fastener such as a bolt and a nut.

The trim cover 14 includes a breaking part 20 serving as a swelling port of the airbag. The breaking part 20 is a sewing portion in which a plurality of skin materials are sewn together. In this example, the breaking part is a sewing portion of a skin material 21 which covers the front surface of the seat back 3 and a skin material 22 which covers the side surface of the seat back 3 and is arranged on a seat front side of the airbag module 4. A slit 23 which passes through the breaking part 20 is formed in the cushion pad 13.

The inflating and deploying airbag reaches the breaking part 20 through the slit 23, and breaks the breaking part 20 by an inflation pressure. The airbag swells to the outside of the seat back 3 through the broken breaking part 20.

The vehicle seat 1 further includes a first stay cloth 30 and a second stay cloth 31 which guide the inflating and deploying airbag to the breaking part 20, a first fixing member 32 which stretches and supports the first stay cloth 30, a second fixing member 33 which stretches and supports the second stay cloth 31, and an attachment member 34 to which the first fixing member 32 and the second fixing member 33 are attached.

The first stay cloth 30 and the second stay cloth 31 are made of a material having a low elasticity. For example, the first stay cloth 30 and the second stay cloth 31 are woven cloth or non-woven cloth using polyester fiber or polyamide fiber. For example, the first fixing member 32 and the second fixing member 33 may use a material made of a steel wire, also referred to as a so-called listing wire. However, the invention does not limit to steel, and the first fixing member 32 and the second fixing member 33 may be made of a resin material such as polyacetal resin and nylon resin.

Respective one end portions of the first stay cloth 30 and the second stay cloth 31 are sewn together with the skin materials 21 and 22 at the breaking part 20, and the first stay cloth 30 and the second stay cloth 31 are pulled to the airbag module 4 through the slit 23. The first stay cloth 30 and the second stay cloth 31 pulled to the airbag module 4 are branched into two and surround the airbag module 4 cooperatively with the backside frame 11.

The other end portion 35 of the first stay cloth 30 is sewn in a cylindrical shape, and the first fixing member 32 which stretches and supports the first stay cloth 30 is inserted into the cylindrical end portion 35. The end portion 35 of the first stay cloth 30 is arranged near an edge portion 15 on the seat front side of the backside frame 11. Both end portions 36 of the first fixing member 32 go around the edge portion 15 on the seat front side of the backside frame 11 toward the opposite side of the airbag module 4 and extend to the rear side of the backside frame 11.

Similarly, the other end portion 37 of the second stay cloth 31 is sewn in a cylindrical shape, and the second fixing member 33 which stretches and supports the second stay cloth 31 is inserted into the cylindrical end portion 37 of the second stay cloth 31. The end portion 37 of the second stay cloth 31 is arranged near an edge portion 16 on a seat rear side of the backside frame 11. The both end portions 38 of the second fixing member 33 go around the edge portion 16 of the seat rear side of the backside frame 11 toward the opposite side of the airbag module 4 and extend to the rear side of the backside frame 11.

The attachment member 34 is provided on the rear side of the backside frame 11. In this example, the attachment member 34 is provided to be continuous to the edge portion 16 on the seat rear side of the backside frame 11 integrally with the backside frame 11. Incidentally, the attachment member 34 may be a bracket separate from the backside frame 11 and be fixed to the backside frame 11. Preferably, the attachment member 34 is integrated with the backside frame 11 as described in this example, and thus it is possible to reduce the number of components and to reduce cost.

The attachment member 34 includes a pair of first attachment holes 39 and a pair of second attachment holes 40. The both end portions 36 of the first fixing member 32 are inserted into the pair of first attachment holes 39. The both end portions 38 of the second fixing member 33 are inserted into the pair of second attachment holes 40.

The first fixing member 32 of which the both end portions 36 are inserted into the pair of first attachment holes 39 is attached at a fixed position to the backside frame 11. Similarly, the second fixing member 33 of which the both end portions 38 are inserted into the pair of second attachment holes 40 is attached at a fixed position to the backside frame 11.

The respective positions of the first fixing member 32 and the second fixing member 33 regarding the backside frame 11 are fixed, and thus the positional relation between the first fixing member 32 and the second fixing member 33 is prevented from being deviated from an expected positional relation. Accordingly, the positional relation between the first stay cloth 30 stretched and supported by the first fixing member 32 and the second stay cloth 31 stretched and supported by the second fixing member 33 is also prevented from being deviated from the expected positional relation.

The respective positions of the first fixing member 32 and the second fixing member 33 regarding the backside frame 11 in which the airbag module 4 is fixed are fixed. Thus, the respective positional relations of the first fixing member 32 and the second fixing member 33 regarding the airbag module 4 are prevented from being deviated from the expected positional relation. Accordingly, the respective positional relations of the first stay cloth 30 and the second stay cloth 31 regarding the airbag module 4 are also prevented from being deviated from the expected positional relation.

The inflating and deploying airbag is held between the first stay cloth 30 and the second stay cloth 31, which have a low elasticity and are stretched and supported, and is guided to the breaking part 20 of the trim cover 14. The first stay cloth 30 and the second stay cloth 31 receive the inflation pressure of the airbag. However, as described above, the positional relation between the first stay cloth 30 and the second stay cloth 31 and the respective positional relations of the first stay cloth 30 and the second stay cloth 31 regarding the airbag module 4 are maintained in the expected positional relation. Thus, the inflation pressure of the airbag can be condensed reliably on the breaking part 20, and the breaking part 20 can be quickly broken to improve the reliability of the inflation and the deployment of the airbag.

With such a simple configuration that the both end portions 36 of the first fixing member 32 which stretches and supports the first stay cloth 30 are inserted into the pair of first attachment holes 39 of the attachment member 34, and the both end portions 38 of the second fixing member 33 which stretches and supports the second stay cloth 31 are inserted into the pair of second attachment holes 40 of the attachment member 34, it is possible to maintain the positional relation between the first stay cloth 30 and the second stay cloth 31 and the respective positional relations of the first stay cloth 30 and the second stay cloth 31 regarding the airbag module 4 to the expected positional relation, and it is also possible to reduce the burden of the assembly operation. For example, the pair of first attachment holes 39 and the pair of second attachment holes 40 are formed together when the attachment member 34 is formed by punching a metal plate which is a material of the attachment member 34. Thus, the pair of first attachment holes 39 and the pair of second attachment holes 40 are easily formed in the attachment member 34.

Preferably, a pitch P1 of the pair of first attachment holes 39 is different from a pitch P2 of the pair of first attachment holes 40. Accordingly, it is possible to prevent n assembly error of the both end portions 38 of the second fixing member 33 being inserted into the pair of first attachment holes 39, and the both end portions 36 of the first fixing member 32 being inserted into the pair of second attachment holes 40. It is possible to reliably set the positional relation between the first stay cloth 30 and the second stay cloth 31 and the respective positional relations of the first stay cloth 30 and the second stay cloth 31 regarding the airbag module 4 to the expected positional relation.

Preferably, as illustrated in FIG. 2, the both end portions 36 of the first fixing member 32 and the both end portions 38 of the second fixing member 33 are bent in a U shape. The first fixing member 32 is stretched by the first stay cloth 30 receiving the inflation pressure of the airbag. However, the both end portions 36 of the first fixing member 32 are curved in the U shape such that the both end portions 36 are prevented from carelessly falling out of the pair of first attachment holes 39. Similarly, the both end portions 38 of the second fixing member 33 are curved in the U shape such that the both end portions 38 are prevented from carelessly falling out of the pair of second attachment holes 40. Thus, it is possible to further improve the reliability of the inflation and the deployment of the airbag.

Figure 4:
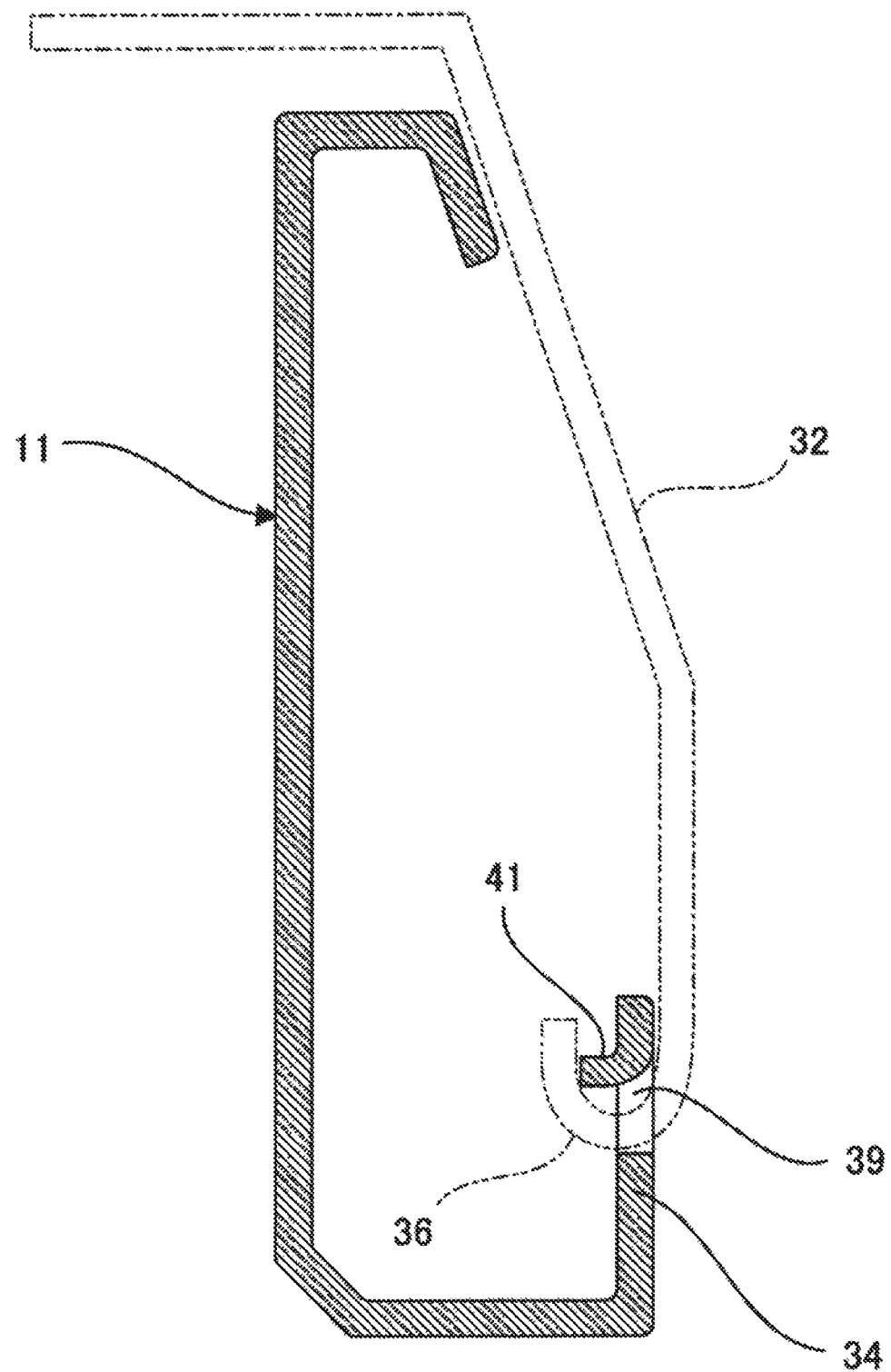
FIG. 4 is a sectional view of a modification of an attachment member of FIG. 3.

When the both end portions 36 of the first fixing member 32 are curved in the U shape, preferably, as illustrated in FIG. 4, a cut-and-bent piece 41 engaged inside the end portion 36 of the first fixing member 32 is provided in the edge portion of the first attachment hole 39. The cut-and-bent piece 41 is caught inside the end portion 36 curved in the U shape such that the end portion 36 is further reliably prevented from carelessly falling out of the first attachment hole 39. Similarly, when the both end portions 38 of the second fixing member 33 are curved in the U shape, preferably, the cut-and-bent piece engaged inside the end portion 38 of the second fixing member 33 is provided in the edge portion of the second attachment hole 40.

Figure 5:
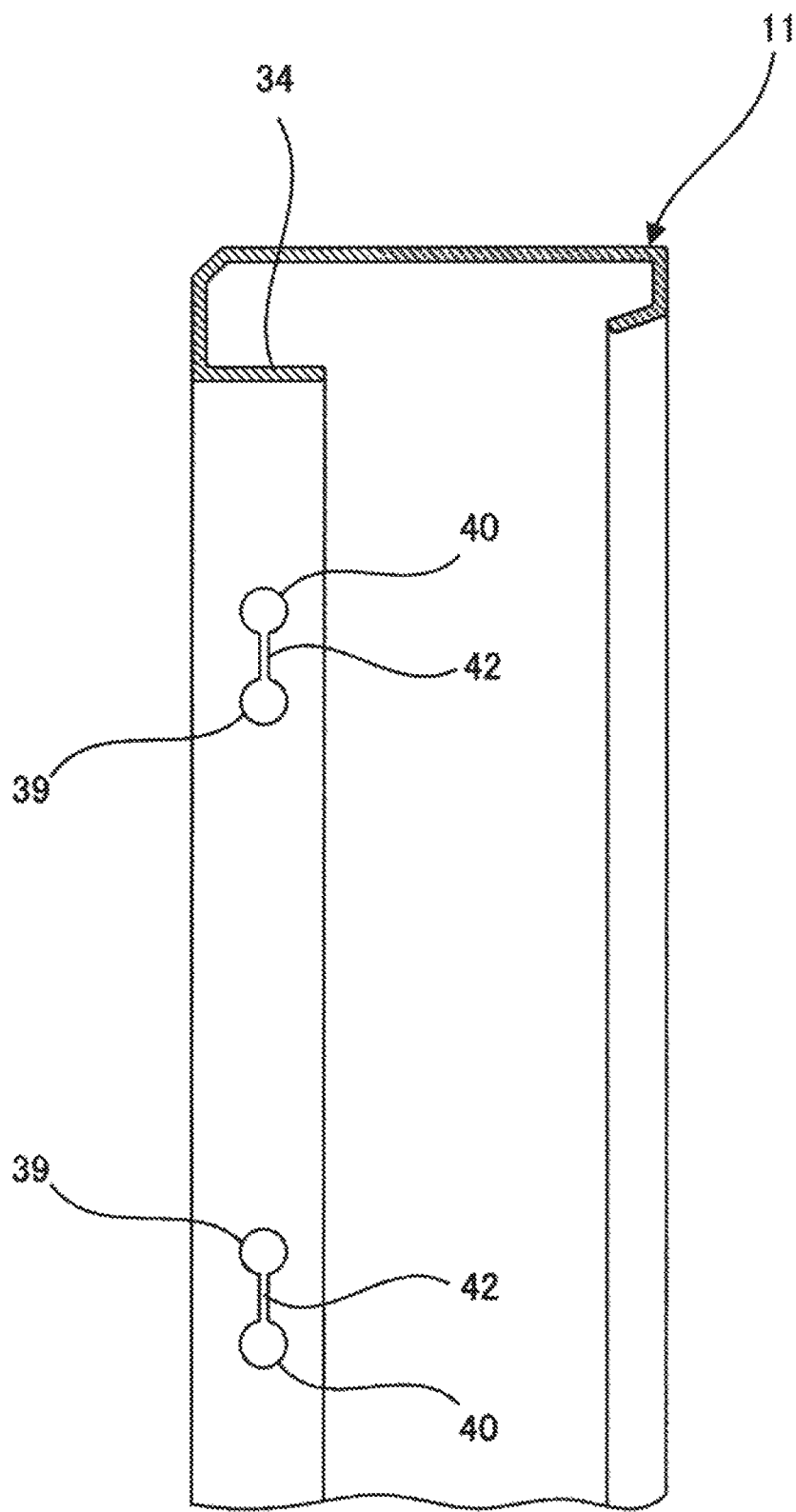
FIG. 5 is a front view of another modification of the attachment member of FIG. 3.

In the example illustrated in FIG. 3, the pair of first attachment holes 39 and the pair of second attachment holes 40 are provided separately. However, as illustrated in FIG. 5, one first attachment hole 39 and one second attachment hole 40 arranged near the one first attachment hole 39 may be connected through a slit 42 formed to have an opening width smaller than the diameter of the first fixing member 32 and the diameter of the second fixing member 33. Similarly, the other first attachment hole 39 and the other second attachment hole 40 may be also connected through the slit 42.

Figure 6:
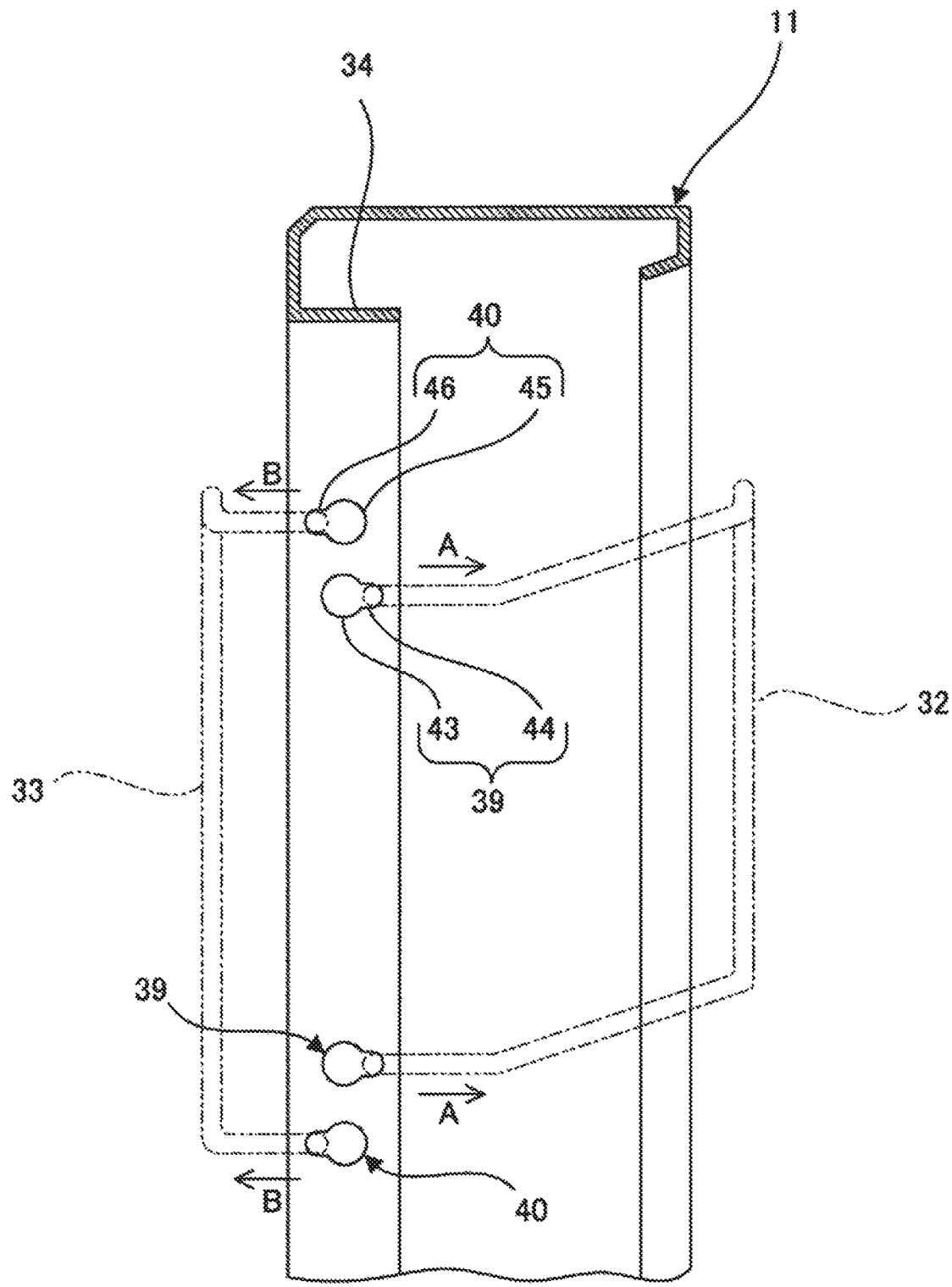
FIG. 6 is a front view of another modification of the attachment member of FIG. 3.

In the example illustrated in FIG. 3, all of the pair of first attachment holes 39 and the pair of second attachment holes 40 are formed in a circular shape. However, the shape is not limited thereto and may be formed to be, for example, an elliptical shape. As illustrated in FIG. 6, the shape may be formed to be different shapes. In the example illustrated in FIG. 6, the first attachment hole 39 is provided with a first insertion part 43 and a first locking part 44 having the smaller opening width than the first insertion part 43. The first locking part 44 extends from the first insertion part 43 in a tensile direction A of the first fixing member 32 stretched by the first stay cloth 30. When the end portion 36 of the first fixing member 32 is inserted into the first attachment hole 39, the end portion 36 is inserted into the first insertion part 43 having the relatively large opening width to improve the operability. After the end portion 36 is inserted into the first insertion part 43, the first fixing member 32 is stretched by the first stay cloth 30, and the end portion 36 is pulled in the first locking part 44 having the relatively small opening width. Accordingly, it is possible to reliably prevent the end portion 36 from carelessly falling out of the first attachment hole 39. Similarly, the second attachment hole 40 is provided with a second insertion part 45 and a second locking part 46 having the smaller opening width than the second insertion part 45. The second locking part 46 extends from the second insertion part 45 in a tensile direction B of the second fixing member 33 stretched by the second stay cloth 31. Accordingly, it is possible to improve the operability when inserting the end portion 38 of the second fixing member 33 into the second attachment hole 40, and it is possible to further reliably prevent the end portion 38 from carelessly falling out of the second attachment hole 40.

Figure 7:
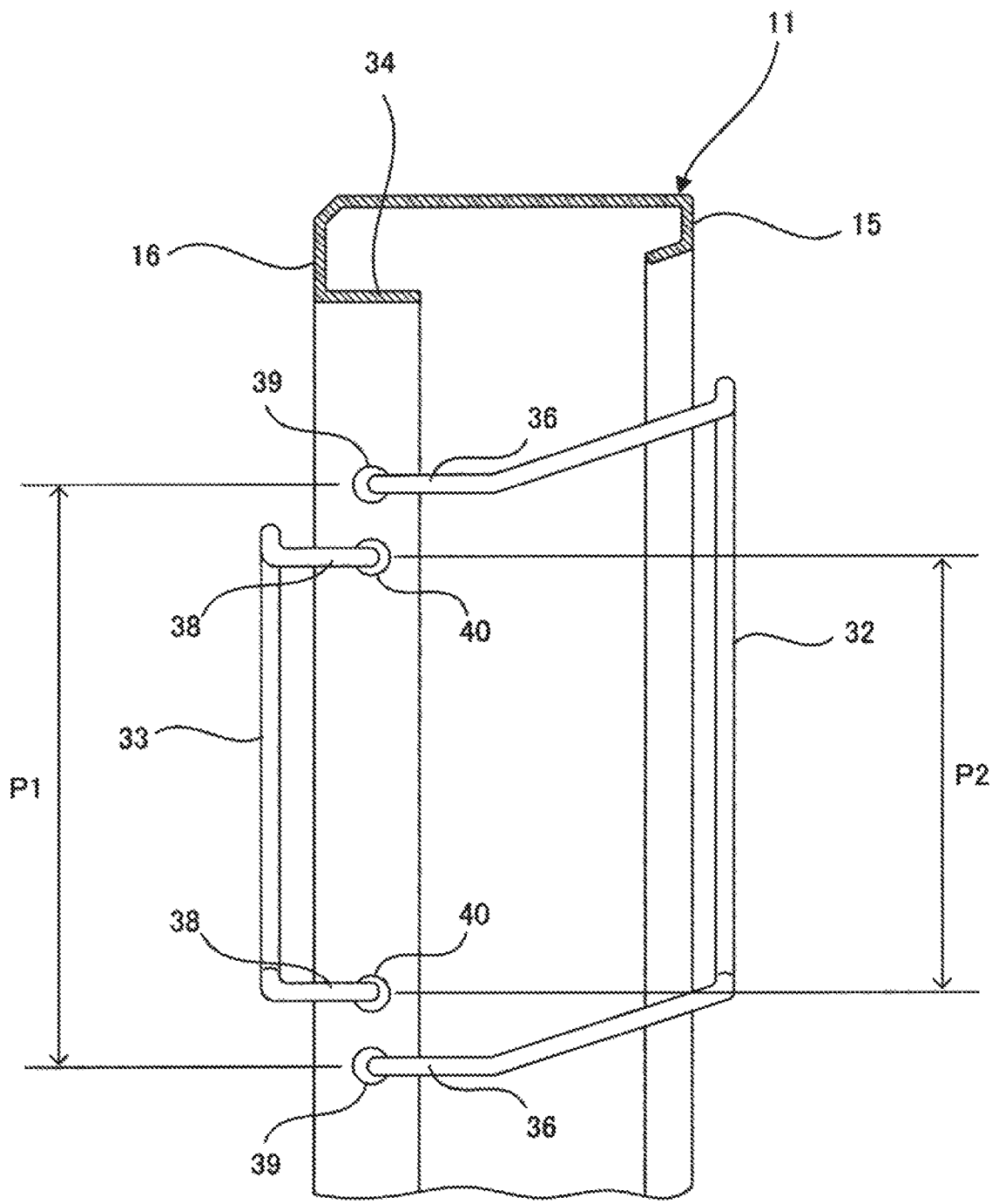
FIG. 7 is a schematic view of another example of the airbag module installation place of FIG. 2.
Figure 8:
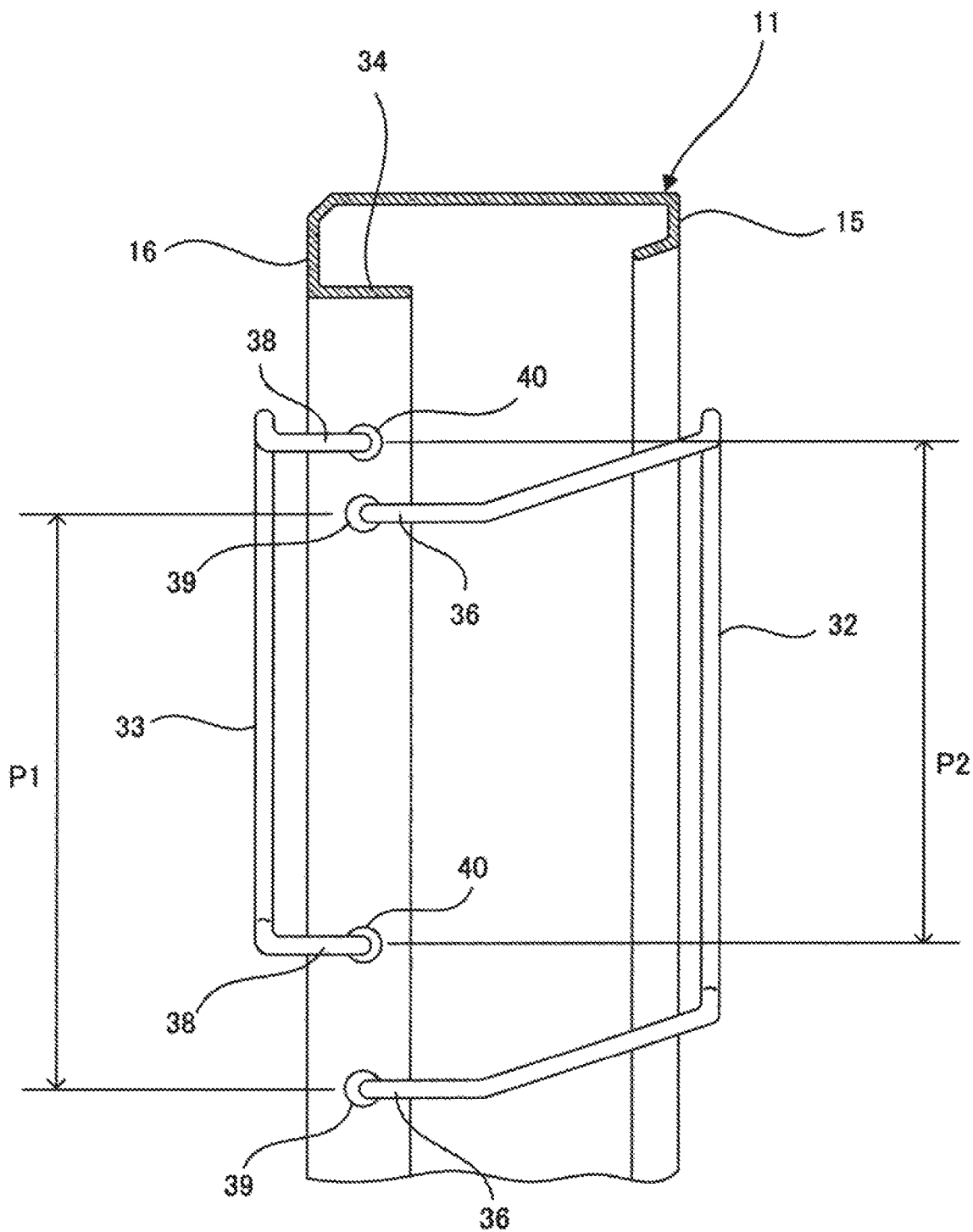
FIG. 8 is a schematic view of another example of the airbag module installation place of FIG. 2.
Figure 9:
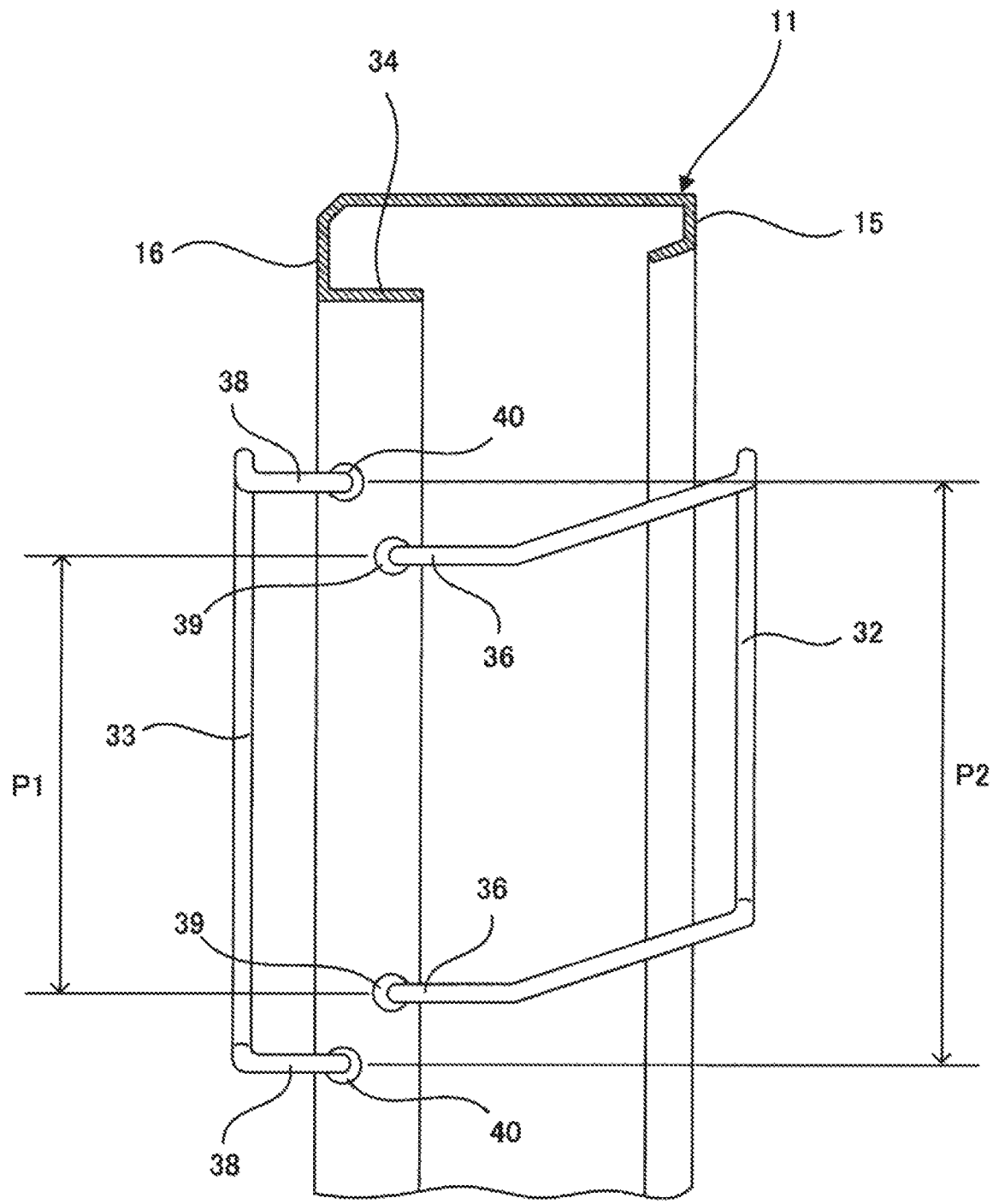
FIG. 9 is a schematic view of another example of the airbag module installation place of FIG. 2.

In the example illustrated in FIG. 3, the pair of first attachment holes 39 and the pair of second attachment holes 40 are arranged on the same straight line, and the pair of first attachment holes 39 are arranged on the inner side of the pair of second attachment holes 40. However, as illustrated in FIG. 7, the pair of second attachment holes 40 may be arranged on the inner side of the pair of first attachment holes 39. As illustrated in FIG. 8, the first attachment hole 39 and the second attachment hole 40 may be arranged alternately. As illustrated in FIG. 9, the pair of first attachment holes 39 and the pair of second attachment holes 40 may be arranged on different straight lines.

The configuration of the seat 1 provided in a vehicle such as an automobile may be applied to a seat of another vehicle such as a ship or an airplane.

Hereinbefore, as described above, the vehicle seat disclosed in this specification includes a seat frame; an airbag module fixed to the seat frame; a trim cover including a breaking part in which skin materials are sewn together and which serves as a swelling port of an airbag by being broken according to an inflation and a deployment of the airbag of the airbag module; a first stay cloth and a second stay cloth sewn together at the breaking part with the trim cover and which guide the inflating and deploying airbag to the breaking part; a first fixing member attached to an attachment member which is any of the seat frame and a bracket fixed to the seat frame and stretches and supports the first stay cloth; and a second fixing member attached to the attachment member and stretches and supports the second stay cloth. The attachment member is provided with a pair of first attachment holes into which both end portions of the first fixing member are inserted and a pair of second attachment holes into which both end portions of the second fixing member are inserted.

In the vehicle seat disclosed in this specification, a pitch of the pair of first attachment holes and a pitch of the pair of second attachment holes are different from each other.

In the vehicle seat disclosed in this specification, the both end portions of the first fixing member and the both end portions of the second fixing member are curved in a U shape.

In the vehicle seat disclosed in this specification, a cut-and-bent piece engaged inside the end portion of the first fixing member is provided in an edge portion of the first attachment hole, and a cut-and-bent piece engaged inside the end portion of the second fixing member is provided in an edge portion of the second attachment hole.

In the vehicle seat disclosed in this specification, the first attachment hole includes a first insertion part and a first locking part having a smaller opening width than the first insertion part, the first locking part extends from the first insertion part in a tensile direction of the first fixing member stretched by the first stay cloth, the second attachment hole includes a second insertion part and a second locking part having a smaller opening width than the second insertion part, and the second locking part extends from the second insertion part in a tensile direction of the second fixing member stretched by the second stay cloth.

What is claimed is:

1. A vehicle seat comprising:
   a seat frame;
   an airbag module fixed to the seat frame;
   a trim cover including a breaking part in which skin materials are sewn together and which serves as a swelling port of an airbag by being broken according to an inflation and a deployment of the airbag of the airbag module;
   a first stay cloth and a second stay cloth sewn together at the breaking part with the trim cover and which guide the inflating and deploying airbag to the breaking part;
   a first fixing member attached to an attachment member which is any of the seat frame and a bracket fixed to the seat frame and stretches and supports the first stay cloth; and
   a second fixing member attached to the attachment member and stretches and supports the second stay cloth, wherein
   the attachment member is provided with a pair of first attachment holes into which both end portions of the first fixing member are inserted and a pair of second attachment holes into which both end portions of the second fixing member are inserted,
   the first attachment hole includes a first insertion part and a first locking part having a smaller opening width than the first insertion part;
   the first locking part extends from the first insertion part in a tensile direction of the first fixing member stretched by the first stay cloth;
   the second attachment hole includes a second insertion part and a second locking part having a smaller opening width than the second insertion part; and
   the second locking part extends from the second insertion part in a tensile direction of the second fixing member stretched by the second stay cloth.

2. The vehicle seat according to claim 1, wherein a pitch of the pair of first attachment holes and a pitch of the pair of second attachment holes are different from each other.

3. The vehicle seat according to claim 1, wherein the both end portions of the first fixing member and the both end portions of the second fixing member are curved in a U shape.

4. The vehicle seat according to claim 3, wherein:
   a cut-and-bent piece engaged inside the end portion of the first fixing member is provided in an edge portion of the first attachment hole; and
   a cut-and-bent piece engaged inside the end portion of the second fixing member is provided in an edge portion of the second attachment hole.

* * * * *